Dec. 21, 1943.  R. D. HILL  2,337,470
OIL FILTER
Filed June 21, 1941  2 Sheets-Sheet 1

Inventor
ROLO D. HILL
By Hazard & Miller
Attorneys

Dec. 21, 1943.    R. D. HILL    2,337,470
OIL FILTER
Filed June 21, 1941    2 Sheets-Sheet 2

Inventor
Rolo D. Hill
By Hazard & Miller
Attorneys

Patented Dec. 21, 1943

2,337,470

UNITED STATES PATENT OFFICE 2,337,470

OIL FILTER

Rolo D. Hill, Los Angeles, Calif., assignor of one-half to Guy S. Tucker, Los Angeles, Calif.

Application June 21, 1941, Serial No. 399,054

4 Claims. (Cl. 210—131)

This invention relates to improvements in filters, and primarily to oil filters used for filtering the crankcase oil of internal combustion engines, such as those used on automobiles.

An object of the invention is to provide an improved filter construction which has a filtering unit that can be very easily and quickly removed and renewed by replacement.

More specifically, an object of the invention is to provide a filter having a replaceable filtering unit which is so designed that there is no danger of leakage of oil from the filter and the use of gaskets or the equivalent is eliminated.

In filters of this character that are now in general use the replaceable filtering unit or cartridge is disposed within a receptacle wherein oil is supplied under pressure from the crankcase. The oil filters through the filtering material toward its center where an outlet is provided that returns the filtered oil to the crankcase or to the oil system. When the oil is filtered from the outside of the filtering material toward the center the impurities or suspended matter therein collect and lodge on the exterior of the filter medium and frequently pack between the filter medium and the walls of the surrounding receptacle so that it is very difficult to remove and replace the cartridge or filter medium when it is desired to replace it.

In accordance with the present invention the direction of flow is reversed wherein the dirty oil or oil to be filtered enters the filter medium adjacent its center so that the impurities or suspended matter are retained therein and the filtrate seeps through on the exterior of the filter medium. Consequently, the impurities or suspended matter do not lodge or cake between the filter medium and the walls of the surrounding receptacle to hinder or impede removal or replacement of the filter medium.

Where the incoming oil to be filtered is delivered to the receptacle under pressure to force its passing through the filter medium from the exterior thereof to its center the surrounding receptacle must be rendered leakproof. This is usually done by gaskets which are apt to be a source of considerable trouble due to shrinkage and leakage. By the present construction the use of such gaskets and leakproof joints is entirely eliminated. Instead of making the surrounding receptacle leakproof no attempt is made to render the receptacle leakproof and in some instances it is desirable to vent it.

With the foregoing and other objects in view, which will be made manifest in the following detailed description and specifically pointed out in the appended claims, reference is had to the accompanying drawings for an illustrative embodiment of the invention, wherein:

Figure 1:
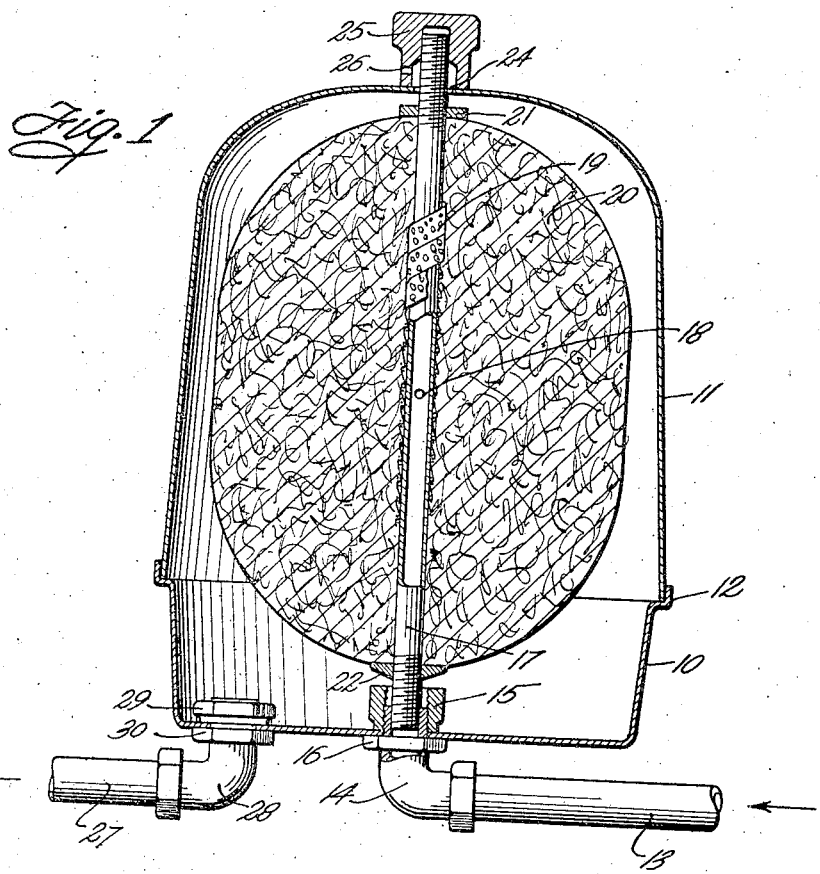
Figure 1 is a sectional view through one form of the improved filter embodying the present invention.
Figure 2:
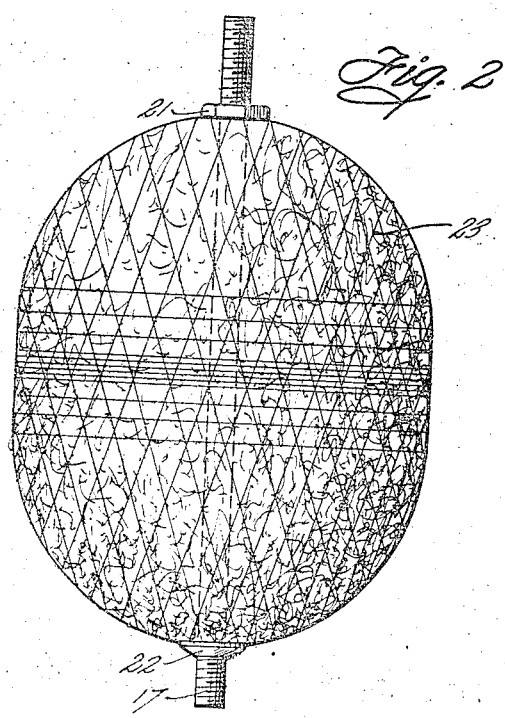
Fig. 2 is a view in side elevation of the filtering unit employed in Fig. 1.

Referring to the accompanying drawings wherein similar reference characters designate similar parts throughout, 10 designates the bottom of a receptacle, the cover of which is indicated at 11 and which is designed to have its bottom edges rest on a suitable shoulder 12. 13 indicates tubing that provides an inlet passage leading through the bottom of the receptacle preferably adjacent the center thereof. The particular manner in which the tubing 13 is attached to the bottom of the receptacle is immaterial but for purposes of illustration it is illustrated as being equipped with an elbow 14 equipped with opposed nuts 15 and 16.

The interior of the elbow is threaded to receive the lower end of a tubular member or section of tubing indicated at 17, in which there is formed one or more outlet openings 18, these being arranged approximately midway between the top and bottom of the tubing 17. The top of the tubing is closed by a closure, not shown.

In the preferred form of construction a section of screen 19 is wrapped around the tubing adjacent the outlet openings 18. Filtering material 20 is supported by and surrounds the tube 17 above and below the outlet openings 18. This filtering material may be held in proper position thereon by shoulders or nuts 21 and 22 which are screwed, pressed, sweated, or otherwise applied to the tubing.

The filtering material 20 may vary. An inexpensive material that may be employed consists of braided or twisted cordage wrapped around the tubing 17 and the screen 19 thereon to form a substantially ovate or elliptical ball. This cordage may be held in place by outer wrapping of cords, wires, or the like indicated at 23. Obviously, other filtering material may be substituted for the particular filtering material above described, and the particular filtering material employed may thus be regarded as optional. It should possess the characteristics however of resisting separation or disintegration when subjected to internal pressures and the cords or wires 23 surrounding horizontally wrapped cordage will ordinarily adequately suffice for this purpose.

The top of the tubing 17 extends through an opening 24 in the cover and a nut 25 equipped with a vent opening 26 is applied to the tubing to hold the cover in place. The vent opening 26 permits the ingress of air to prevent any vacuum conditions arising within the receptacle. However, in many instances the presence of such a vent opening may be regarded as optional.

27 indicates outlet tubing providing an outlet passageway from the filter. This tubing may be connected to the bottom of the receptacle as by elbow 28 equipped with opposed nuts 29 and 30. The tubing 17 constitutes a continuation of the inlet passage provided by the tubing 13. This continuation extends upwardly into the receptacle and provides the support for the filtering medium 20, the exterior surface of which are in decided spaced relation to the walls of the receptacle. The incoming oil that is to be filtered is thus caused to pass upwardly through tubing 17 and to be discharged in the center of the filtering material 20 through the outlet openings 18. Some distribution of the discharged oil is accomplished by the screen 19. The oil is forced out through the filtering material and is thus effectively filtered. Any tendency to channel through the filtering material is ordinarily self-stopping in that the channels become filled with deposited impurities and suspended matter. The filtered oil or filtrate finally seeps through the filtering material on the exterior thereof and any drip or flow by gravity to the bottom of the receptacle finally flowing out of the receptacle through the outlet passage provided by tubing 27. The oil that has filmed on the exterior of the filtering material and which flows by gravity to the bottom of the receptacle is usually maintained therein at a very low level seldom reaching the bottom of the filtering material. Consequently, the joint between the receptacle and the cover at shoulder 12 need not be leakproof. Highly volatile constituents in the oil are readily released through the oil film on the exterior of the filtering material. These volatile constituents may vaporize and pass out through opening 24 in the cover 11 which is in spaced relation to tube 17 and through the vent 26 in nut 25.

From the above-described construction it will be appreciated that no gaskets are required between the cover 11 and the receptacle bottom 10. In fact no leakproof joint is required in the receptacle. Ordinarily the threaded connection between the bottom of the tubing 17 and elbow 14 will not leak, but if a small amount of leakage does take place at this point it is usually of such a minor quantity as to be immaterial. As only filtered oil reaches the exterior of the filtering material 20 there is no opportunity for foreign material or suspended matter in the oil to lodge or cake between the filter unit and the walls of the receptacle that would hinder the removal of the filter unit when it is desired to replace it. Whenever it is desired to replace the filter unit this can be easily accomplished by removing nut 25 and cover 11. Then tube 17 with the filter material 20 mounted thereon can be readily unscrewed from elbow 14, removed, and replaced.

Figure 3:
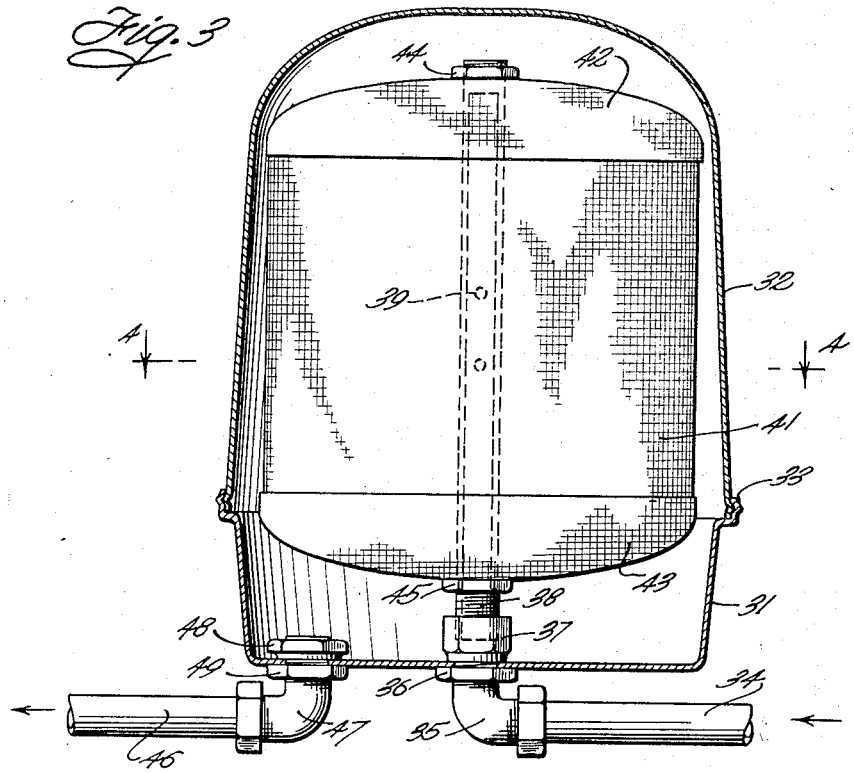
Fig. 3 is a sectional view through another form of filter embodying the present invention.
Figure 4:
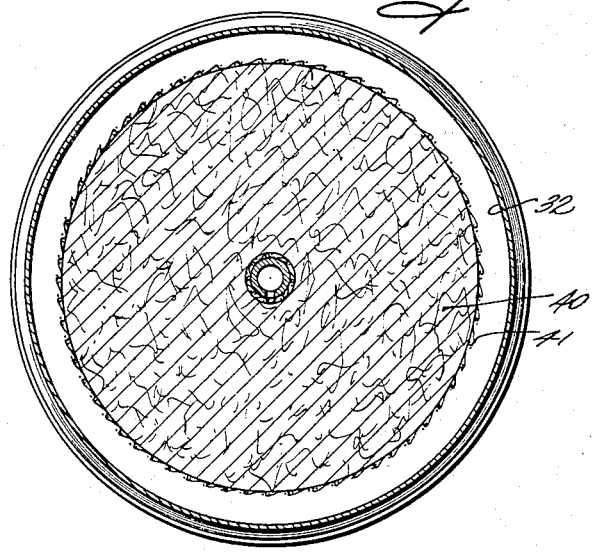
Fig. 4 is a horizontal section taken substantially upon the line 4—4 upon Fig. 3.

In the construction illustarted in Figs. 3 and 4, the bottom of the receptacle is indicated at 31 having a removable cover 32 which may be attached to the bottom either by partial threads 33 stamped or formed thereon or an equivalent bayonet joint. The inlet passage is provided by tubing 34 equipped with an elbow 35 having the opposed nuts 36 and 37. The tubing 38 which forms a continuation of the inlet passage is screwed into the upper threads of the nut 36 and extends upwardly into the container. This tubing has one or more outlet openings 39 which may be surrounded by screen corresponding to screen 19. The filtering material 40 which may be of any desired form or material is held about the tubing 38 by means of screen there being preferably a central band section of screen 41 and top and bottom caps 42 and 43 which are likewise formed of screen. Nuts 44 and 45 hold the screen and filtering material on the tube 38. The outlet from the receptacle is illustrated as being provided by tubing 46 and an elbow 47 equipped with nuts 48 and 49.

The operation and advantages of this form of construction are substantially the same as those previously described. The incoming oil is conveyed through the continuation of the inlet passage provided by the tube 38 to approximately the center of the filtering material 40 where it is discharged through the outlet openings 39. The top of the tube 38 is closed. The filtering material is held confined about the tube 38 by the screen. The filtrate is caused to pass through the filtering material, collect on the exterior of the screen and drip or flow by gravity to the bottom of the receptacle, and then through the outlet passage 46. In this form of construction as previously described, there is no caking between the filter unit and the walls of the receptacle so that when it is desired to replace the filter unit this can at all times be easily accomplished by merely removing cover 32 and unscrewing filter unit from nut 36 following which replacement may be readily effected.

From the above-described construction it will be appreciated that no strong pressure-retaining vessel need be employed for the surrounding container. The use of gaskets in the surrounding container is likewise completely avoided. At all times the filtering cartridge is rendered readily available for replacement which is accomplished by merely detaching it from the inlet passage-providing means. Danger of any caking around the filter unit is entirely avoided.

Various changes may be made in the details of construction without departing from the spirit or scope of the invention as defined by the appended claims.

I claim:

1. An oil filter comprising means providing a receptacle having a removable cover, means providing inlet and outlet passages leading to and from the receptacle adjacent the bottom thereof, tubular means having a detachable connection with the inlet passage-providing means and forming a continuation thereof within the receptacle, said tubular means having one or more outlet openings, and filtering material supported upon said tubular means around said outlet openings in spaced relation to the interior of the receptacle above the outlet passage so that incoming fluid is caused to flow outwardly therethrough to be filtered and drip therefrom to the bottom of the receptacle and pass to the outlet.

2. An oil filter comprising means providing a receptacle having a removable cover, means providing inlet and outlet passages leading to and from the receptacle adjacent the bottom thereof, tubular means having a detachable connection with the inlet passage-providing means and forming a continuation thereof within the receptacle, said tubular means having one or more outlet openings, and filtering material supported upon said tubular means around said outlet openings in spaced relation to the walls of the receptacle above the outlet passage so that incoming fluid is caused to flow outwardly therethrough to be filtered and drip therefrom to the bottom of the receptacle and pass to the outlet, there being a vent for the receptacle.

3. An oil filter comprising means providing a receptacle having inlet and outlet passages adjacent the bottom thereof, means providing a detachable continuation of the inlet passage within the receptacle, said continuation having one or more outlet openings therein, and filtering material supported on said continuation around said outlet openings, said filtering material presenting an exterior surface in spaced relation to the walls of the receptacle above the outlet passage whereby fluid entering through said inlet passage is filtered as it passes outwardly through said filtering material on said surface and after flowing downwardly thereon may be collected by the receptacle and flow to the outlet.

4. An oil filter comprising means providing a receptacle having inlet and outlet passages adjacent the bottom thereof, means providing a detachable continuation of the inlet passage within the receptacle, said continuation having one or more outlet openings therein and filtering material supported on said continuation around said outlet openings, said filtering material presenting an exterior surface in spaced relation to the walls of the receptacle above the outlet passage whereby fluid entering through said inlet passage is filtered as it passes outwardly through said filtering material on said surface and after flowing downwardly thereon may be collected by the receptacle and flow to the outlet, said receptacle having a vent adjacent its top.

R. D. HILL.